(12) United States Patent
Fahldieck et al.

(10) Patent No.: US 9,061,874 B2
(45) Date of Patent: Jun. 23, 2015

(54) CONTAINER TRANSPORT DEVICE HAVING PLIABLE BOTTLE SUPPORTS

(75) Inventors: Andreas Fahldieck, Idar-Oberstein (DE); Dieter-Rudolf Krulitsch, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 17 days.

(21) Appl. No.: 13/984,650

(22) PCT Filed: Jan. 26, 2012

(86) PCT No.: PCT/EP2012/000335
§ 371 (c)(1),
(2), (4) Date: Nov. 20, 2013

(87) PCT Pub. No.: WO2012/107173
PCT Pub. Date: Aug. 16, 2012

(65) Prior Publication Data
US 2014/0158504 A1 Jun. 12, 2014

(30) Foreign Application Priority Data

Feb. 10, 2011 (DE) .......................... 10 2011 010 954
Feb. 10, 2011 (DE) .......................... 10 2011 010 955

(51) Int. Cl.
| | |
|---|---|
| *B65G 47/84* | (2006.01) |
| *B67C 3/24* | (2006.01) |
| *B65G 47/86* | (2006.01) |
| *B67C 3/22* | (2006.01) |
| *B67C 7/00* | (2006.01) |
| *B65G 47/90* | (2006.01) |

(52) U.S. Cl.
CPC .............. *B67C 3/242* (2013.01); *B65G 47/847* (2013.01); *B67C 3/22* (2013.01); *B67C 7/0046* (2013.01); *B65G 47/846* (2013.01); *B65G 47/908* (2013.01)

(58) Field of Classification Search
CPC ................. B65G 21/00; B65G 47/846; B65G 2201/0244; B65G 2201/02; B65G 29/00; B65G 19/025
USPC ..................... 198/867.02, 473.1, 481.1; 53/77
See application file for complete search history.

(56) References Cited

U.S. PATENT DOCUMENTS

| | | | | |
|---|---|---|---|---|
| 1,574,307 | A | * | 2/1926 | Risser ...................... 198/867.15 |
| 4,075,086 | A | * | 2/1978 | Marsh et al. ................ 198/473.1 |
| 5,373,934 | A | * | 12/1994 | Jackson et al. ............. 198/803.8 |

(Continued)

FOREIGN PATENT DOCUMENTS

| | | |
|---|---|---|
| DE | 25 41 611 | 3/1977 |
| DE | 697 28 396 | 2/2005 |

(Continued)

*Primary Examiner* — James R Bidwell
(74) *Attorney, Agent, or Firm* — Occhiuti & Rohlicek LLP

(57) ABSTRACT

A container transport device includes a counter support along a section thereof, and holding devices arranged opposite the counter support for holding and transporting containers. Each holding device has a base body separate from the container transport device. The base body, which includes spring elements, is configured to engage the counter support at least in a direction toward a center of the container transport device, to make contact underneath a neck ring of a container, and to automatically adapt to a container diameter of the container with the support thereof. The holding device is detachably connectable to the transport device. The base body, which, together with its components is made in one piece from plastic, is elastically pliable in the radial direction.

11 Claims, 12 Drawing Sheets

(56) References Cited

U.S. PATENT DOCUMENTS

| | | | | |
|---|---|---|---|---|
| 7,497,322 B2* | 3/2009 | Lanfranchi | | 198/473.1 |
| 7,832,546 B2* | 11/2010 | Preti et al. | | 198/473.1 |
| 7,954,625 B2* | 6/2011 | Dewert | | 198/473.1 |
| 8,151,544 B2* | 4/2012 | Till et al. | | 53/77 |
| 8,312,985 B2* | 11/2012 | Suther | | 198/473.1 |
| 8,561,783 B2* | 10/2013 | McAllister et al. | | 198/473.1 |
| 2005/0011730 A1 | 1/2005 | Wittmann et al. | | |
| 2010/0077703 A1 | 4/2010 | Gourlaouen | | |

FOREIGN PATENT DOCUMENTS

| | | |
|---|---|---|
| DE | 10 2008 023 776 | 11/2006 |
| DE | 10 2008 022 705 | 11/2009 |
| FR | 2 934 851 | 2/2010 |
| GB | 2 187 720 | 9/1987 |
| WO | WO 2008/009410 | 1/2008 |

* cited by examiner

CONTAINER TRANSPORT DEVICE HAVING PLIABLE BOTTLE SUPPORTS

CROSS REFERENCE TO RELATED APPLICATION

This application is the national phase under 35 USC 371 of international application no. PCT/EP2012/000335, filed Jan. 26, 2012, which claims the benefit of the priority date of German application no. 10 2011 010 954.4, filed Feb. 10, 2011 and German application no. 10 2011 010 955.2, filed Feb. 10, 2011. The contents of the aforementioned applications are incorporated herein in their entirety.

FIELD OF DISCLOSURE

The invention relates to a container transport device in the design of a grinding or sliding star wheel, which comprises a plurality of holding pockets or holding devices for locking and holding bottles or similar containers.

BACKGROUND

DE 10 2008 023 776 A1 discloses a treatment machine for bottles or similar containers, having a rotor or revolving main star on which a number of treatment stations are arranged. To implement the support of the main star with sufficient stability and at a reduced cost, DE 10 2008 023 776 A1 proposes to support the rotor by means of a number of rollers that are arranged distributed about the machine axis and form the bearing support arrangement.

GB 2 187 720 A also discloses a container treatment system. For example, GB 2 187 720 A discloses a capper which has a star wheel with corresponding holding devices. On transport pockets, a removable insert is arranged which has a virtually V-shaped opening and which, at one of its flanks, has a tooth system which is brought into frictional engagement with the bottle. It is thus claimed that the bottle, during capping, can be held with a screw cap without the bottle also rotating.

DE 697 28 396 T2 deals with a processing machine, for example with a labelling machine. It has a star wheel on which labelling devices are arranged. The star wheel can be supplied with containers via a loading device or via a feed star wheel (sliding star). The loading device is designed as a grinding or sliding star wheel which has correspondingly designed tooth pockets (holding device). The sawtooth star wheel places the bottles, which are accelerated by an infeed plate, at pitch.

DE 10 2008 022 705 A1 discloses that the incoming bottles partly begin to dance and may vary the desired pitch, so that destruction can occur, for example at the gripper arms of the grippers provided for the bottles. To thus achieve passive, accurate centring or fixing of the incoming bottle in the sawtooth star while simultaneously calming the bottles' proper motion, DE 10 2008 022 705 A1 proposes to arrange a spring-loaded blade element at each sawtooth section on the side of the sawtooth section opposite the approximately radially oriented contact edge. This measure has proven its worth in practice, so that the bottle neck is accurately pushed into the leading edge of the sawtooth section, automatically resulting in accurate compliance with the pitch distances. At the same time, any dancing or vibrating bottle is calmed in its movement by this firmer fixation.

Therefore, aforementioned treatment machines are known in different versions, e.g. as filling machines, labelling machines, inspection machines or rinsers. Aforementioned containers can, for example, be used as bottles for liquids, e.g. for beverages. The containers, e.g. bottles, can consist of a transparent or translucent material, for example of glass or of a translucent plastic, e.g. PET. However, it is also conceivable that the containers consist of other materials and can be filled with other products. Usually the containers, therefore also PET bottles, have a so-called neck ring with which the bottles can be transported. In case the treatment machine is designed as a capper, the filled, as yet non-closed bottles are transported with sliding stars from the filler to the capper, but also conveyed with the infeed star or with the sliding star to the main carousel. The sliding stars have pockets into which the bottles can be inserted. Insofar, the sliding stars can also be called sawtooth stars, which have already been mentioned and acknowledged above. The sliding star thus reaches, with its pocket edge, under the neck ring. The transport pocket therefore is part of a holding device. Opposite this, a supporting curve is provided which also reaches under the neck ring and on which the bottles can slide off in the transport direction.

For logical reasons, the individual components are adaptably matched. Hence, the individual components are adjustable to some extent, to thus be able to compensate, for example deviations of the neck ring which can also have different dimensions for different bottle runs. This, however, requires adjustments which still cause some production interruption. Moreover, there is a desire to reduce the neck ring, due to the need to save material, not only in its material thickness but also in its radial extension. This desire can reach the point that the above-mentioned compensation options of the components no longer suffice, so that the neck ring no longer has enough support and threatens to drop between the supporting curve and the transport pocket of the sliding star. But it is also possible, for example, that the circumference of the main star of the filler changes due to the laws of physics, which especially affects the operational safety at the handover from/to the sliding star. In particular, the heat expansion of filler carousels leads to the pitch diameter changing by several millimetres (e.g. cold filling at 6° C.; hot filling at 90° C.). But also the normal operational heating of the carousels changes the handover situation and requires regular settings or adjustments of the bottle handovers, which must be precisely matched to the duty point/operating temperature. After all, faults can occur with handover dimensions that are both too large and too small, these being of course unwanted.

SUMMARY

Accordingly, the invention is based on the task of specifying a container transport device of the aforementioned type which, by simple means, avoids operational faults or extensive adjustments, even in case of neck rings with reduced radius or in case of operational changes to the container handover parameters.

Advantageously, it is intended that the respective holding device have a base body separate from the transport device which is designed to a counter support at least in the direction to a centre of the transport device so that the base body contacts underneath a neck ring of the container, contacting the same and the neck ring, automatically adapting to a container diameter with the support thereof, and that the holding device is detachably connectable to the transport device. It is expedient for the base body, at least in the direction to a centre of the transport device, to be of a pliable, that is elastic, design.

A pliability, which exists at least in the direction to a centre of the transport, preferably is a radial pliability, which is useful especially for transport stars since this is where radial forces of the container directly act on the base body, in the direction to the centric middle of the transport star, said forces capable of being accommodated by the radial pliability. To a certain extent, the base body can also be pliable laterally, that is in or contrary to the conveying direction of the sliding star. Of course, the holding device with the base body can also be arranged at a linear conveyor, with the holding device then being at least axially pliable in the direction to the centre line.

It is also advantageous for the base body to be designed as a divider. Thus, the base body is multifunctional. On the one hand, the base body carries the container together with the counter support, which can also be called a supporting curve, with the base body with its support reaching under the neck ring. Furthermore, the base body ensures by virtue of its radial adjustability that the container is always transported safely, even if there are changes in diameter and/or operational changes. On the other hand, the base body ensures the necessary pitch of the containers within the transport device without, for example, a transport star having to be equipped with pockets that are complicated to make.

The invention means that extensive adjustments, especially to transport stars, are not required if the neck ring is also reduced in its radial extension. After all, the holding device or the base body can, in respect of the neck ring, be produced with an excess dimension, as the holding device or its base body is pliable in itself. In this way, the holding device or its base body can reach under these even for small neck ring diameters, with the known supporting curve being provided opposite, on which the container, that is the bottle with its neck ring, can slide off in the transport direction. The holding device designed according to the invention, or its base body, however, can also react automatically to operational changes, with the holding device being pliable during expansion of the filler. As already briefly mentioned above, the invention means that a transport pocket, introduced into the transport star, with its special design can be dispensed with. Special measures or devices for pressing the containers into the transport pocket can also be dispensed with. Dispensing with the transport pocket which, previously, has been very expensive to produce reduces the processing costs of the transport star or sliding star, in addition to other advantages. Due to the inherent radial elasticity, the holding device thus covers a wide range of applications. It can of course happen that the holding devices or their base bodies reach their limits with certain dimensions of the containers, so that a changeover to other holding devices or base bodies can be useful. However, since the changeover is possible without tools, a much shorter downtime can be expected.

Advantageously, the support of the base body can be designed such that it has an approximately central segment-like recess into which the container can be inserted underneath the neck ring. Otherwise, the support, seen in overhead view, is effectively designed as a crossbar.

It is appropriate for external spring bars to laterally join each support or crossbar. The external spring bars have an essentially straight spring arm, each of which transitions into a bent first connecting area. The two external spring bars extend in the same direction, slightly converging from the support, i.e. oriented away from the active surface.

It is beneficial for the base body to have internal spring elements which are connected to a fastening area of the base body. It is appropriate for the respective first connecting areas of the external spring bars to be connected to the fastening area. The internal spring elements have a second connecting area corresponding to the respective first connecting area, said second connecting area transitioning to a bar which is firmly connected to the fastening area of the base body. The first and second connecting areas are preferably designed, in relation to each other, such that both can mesh or be hooked together. It is also possible to provide a separate spring in order to connect the two connecting areas. In both possible configurations, the holding device or the base body is pretensioned if both connecting areas are interlinked, i.e. they mesh or are connected by means of the separate spring.

The holding device or the base body has the fastening area for the detachable connection with the transport device. The fastening area is preferably designed as a fittable internal body which, with its centre axis, is congruent with the centre axis of the base body. With its head end, the fastening area is oriented in the direction to the support. In an appropriate configuration, the fastening area has a first and second receiving area each joined by a first and second engagement area. As regards the clear opening amount, the receiving areas are larger than a clear opening of the respective engagement areas. Starting from the foot end opposite the head end, the first receiving area is arranged first, immediately followed by the first engagement area. The first engagement area is followed by the second receiving area, which transitions to the second engagement area. The second engagement area thus is arranged at the head end. The receiving areas and engagement areas are adapted to attachment bolts, which are connected to the transport device and extend away from it. To connect the holding device to the transport device, the receiving areas are pushed over the attachment bolts. Then the holding device or the base body can be displaced radially, so that the attachment bolts with their circumferences contact the engagement areas or are clamped to their walls with sufficient force-fit. It is possible to provide the attachment bolts, at the foot end, with a holding flange. This is possible if the fastening area, in its respective receiving area, has an excess dimension or is also designed pliably, so that it is diverted when the holding flanges are passing by and, after passing by, is returned to the starting position. Thus, the holding flanges could reach under the free edges of the engagement area, so that additional positional stability is achieved. If the holding device or the base body is connected to the transport device, the two connecting areas of the external spring bars and of the internal spring elements can be connected with each other, i.e. meshed, so that the base body is pretensioned akin to applying a spring force. This also has a force-enhancing effect on the holding force of the engagement areas on [sic] the respective attachment bolts.

In a further beneficial configuration, the engagement areas with side walls contact the attachment bolt virtually tangentially. In a further preferred configuration, the second engagement area encompasses the attachment bolt almost fully, which means that about ¾ of the circumference are encompassed by the second engagement area. Analogously, this can also be provided for the first engagement area. The fastening area can be closed at the foot end.

In a further beneficial configuration, transversal spring elements are preferably arranged at the holding devices or at the base body. A first transversal spring element is allocated to the support, wherein the second transversal spring element is arranged at the second engagement area. Both transversal spring elements extend from an external spring bar to the respective opposite one. The first transversal spring bar, in the preferred configuration, can be connected to the support, wherein the second transversal spring bar is in direct contact with the fastening area. So as not to interfere with the optional flange of the attachment bolt, a corresponding section can be usefully provided at the second transversal spring bar. At least the second transversal spring bar can be designed such that it can take the weight force of the bottle. The same can apply to the first transversal spring. Due to their arrangement and design, both transversal spring bars can also be called leaf springs.

The holding device or the base body can be very easily connected with the transport star wheel, but also be detached from it again. Advantageously, the star wheel, i.e. the sliding star, does not have the complicated configuration of a sawtooth-, grinding- or sliding-star wheel. Instead, preferably, two attachment bolts each, aligned in the radial direction, can be provided, each holding a base body. This achieves an open construction which is particularly easy to clean. Moreover, holes can be provided in the star wheel, which further improve accessibility and cleanability. Evidently, the holding device is particularly easy to assemble and dismantle manually, even without the use of tools. Naturally, a single attachment bolt per base body can also be provided.

Due to the pliability of the holding device or the base body in itself, there is great flexibility with different neck or mouth diameters.

However, it is expedient, in a preferred configuration, for the holding device or its base body not to be displaced along the radial axis (which is defined by the attachment bolts arranged in the radial direction), but to be diverted effectively elastically. Nonetheless, the support is always arranged under the neck ring, thus always reaches under it, so that the container can always slide off positionally secure, even on or along the supporting curve in the conveying direction. This is also achieved for the smallest, still useful neck diameters, as the holding device or the base body is designed for it. For larger diameters underneath the neck ring, the holding device is then diverted elastically in itself, which is achieved by the interaction of the individual components.

It is possible to arrange the base body, on its own, at the star wheel or at the transport device. However, it is also useful if a sliding or guiding element is provided, which can be arranged on the side of the transport star which is opposite the base body. The sliding or guiding element can essentially be of a parabolic design with an opening that expands from the closed end. Thus, this element too is of a particularly simple design and adapted to different mouth openings. The sliding or guiding element effects a driving of the bottle, held by means of the base body and the supporting curve, in the transport direction. However, the sliding or guiding element above the neck ring is in corresponding contact with the bottle. Of course, the sliding or guiding element can also be slightly pliable, which means that its legs can be diverted slightly due to spring control, to lead the bottle into force-fit contact with both legs.

However, of course, a configuration is also possible in which the base body and the sliding or guiding element are arranged on the same side, preferably on an upper side of the transport star in the installation position. In a preferred design, the transport star is thinner at its external edge area than the remaining material thickness or has a corresponding recess at the intended mounting position of the holding device or of the base body. The holding device is inserted into this intended mounting position. To effect a height adjustment, hence to achieve that the sliding or guiding element engages the bottle mouth above the neck ring, a compensating element is provided which covers the base body like a housing. Advantageously, the sliding or guiding element is arranged at the lid wall of the compensating element.

In a further possible configuration, the holding device which, for example, is formed from the base body, the compensating element and the sliding or guiding element, is connected with common bolts to the transport star. It is also possible to provide a spring which acts on the base body, which is why the base body, departing from the force-fit connection, can have elongated holes over the engagement area, not only to the make the base body pliable in itself but to also achieve a certain radial displaceability.

BRIEF DESCRIPTION OF THE FIGURES

Further advantageous configurations of the invention are disclosed in the subclaims and the following figure descriptions, with FIG. 1 showing a container treatment machine in principal view, FIG. 2 showing a transport scenario in side view, FIG. 3 showing a base body of a holding device as a detail in a view from above, FIG. 4 showing the base body from FIG. 3 in a perspective view from below FIG. 5 to FIG. 7 showing a sequence for assembling the holding device to a transport device, FIG. 8 showing a scenario of assembling the base body to a sliding star, on the one hand in plan view and on the other hand from below, FIG. 9 showing the assembly scenario from FIG. 8 always in perspective view, FIG. 10 showing a transport scenario in perspective view, FIG. 11 showing a further execution example relating to FIG. 8 with a sliding and guiding element, and FIG. 12 showing a further execution example, on the one hand in perspective view and on the other hand in exploded view.

In the different figures, the same parts are always given the same reference symbols, which is why these are usually only described once.

DETAILED DESCRIPTION

Figure 1:
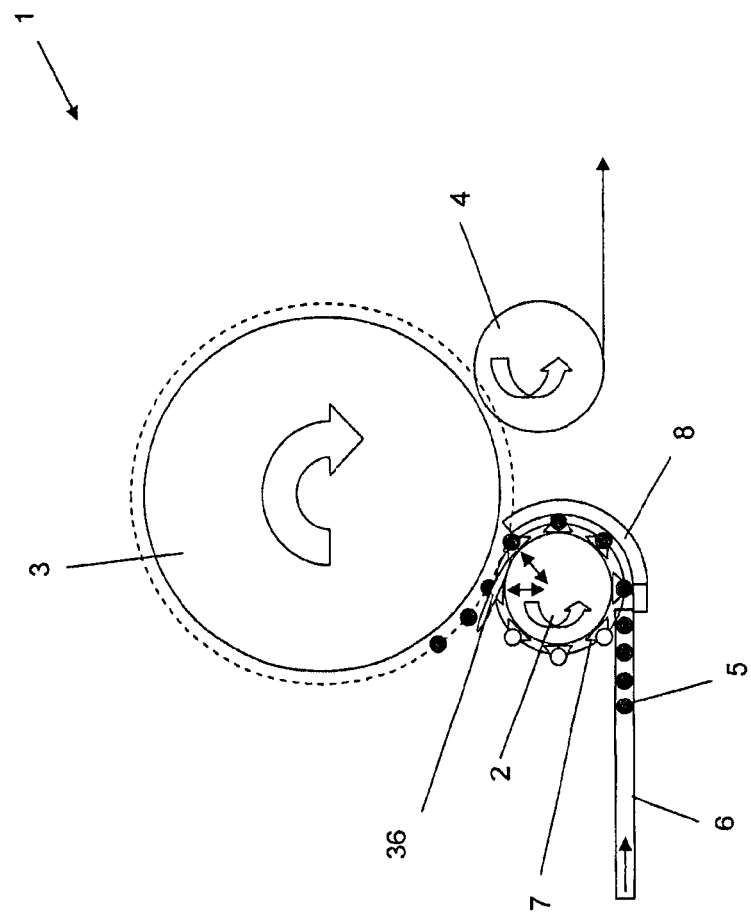

FIG. 1 shows a container treatment machine 1 which, by way of example, is designed as a filling machine or filler. It is generally known.

The container treatment machine 1 has transport devices 2, 3 and 4, therefore an infeed star 2, a main star 3 and an outfeed star 4. The infeed star 2 is supplied with containers 5 on a conveyor 6. The containers 5 are transported from the infeed star 2 to the main star 3 or filler carousel 3 and, with it, to the outfeed star 4. Filling stations are arranged on the filler carousel 3.

Figure 2:
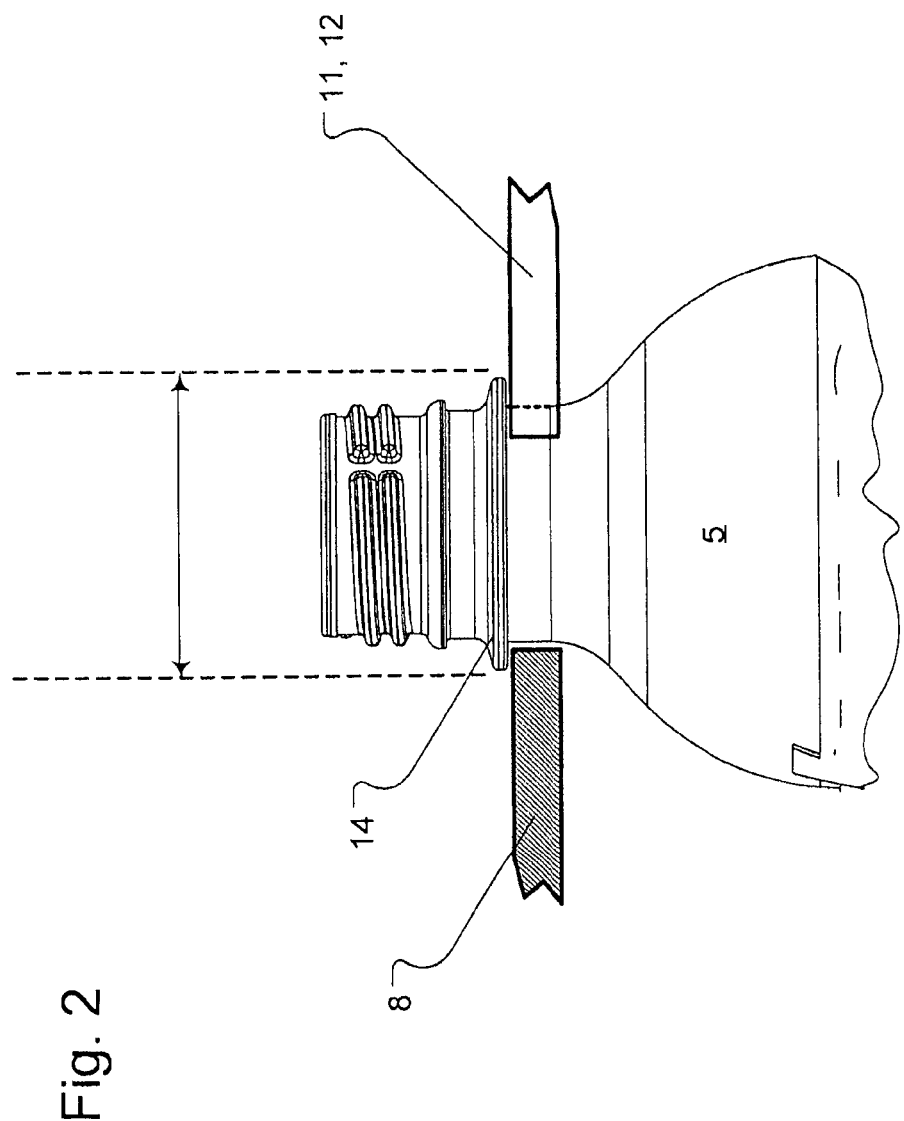

For example, the infeed star 2 can be called a sliding star 2, which has a plurality of holding devices 7 for holding the containers 5 such as PET bottles. In FIG. 1, it is evident from the filled circles (which represent the containers 5) that the containers 5 are transported by means of the holding devices 7 to the main star 3. Unoccupied holding devices 7 are represented in FIG. 1 by unfilled circles. The holding devices 7 are shown simplified in FIG. 1. By way of example, the infeed star 2 is partially encompassed by a counter support 8 which, hereinafter, is called a supporting curve 8, on which the containers 5 with their neck rings 14 (FIG. 2) can slide off. Moreover, preferably, fixed bridging elements 36 are also provided.

Figure 3:
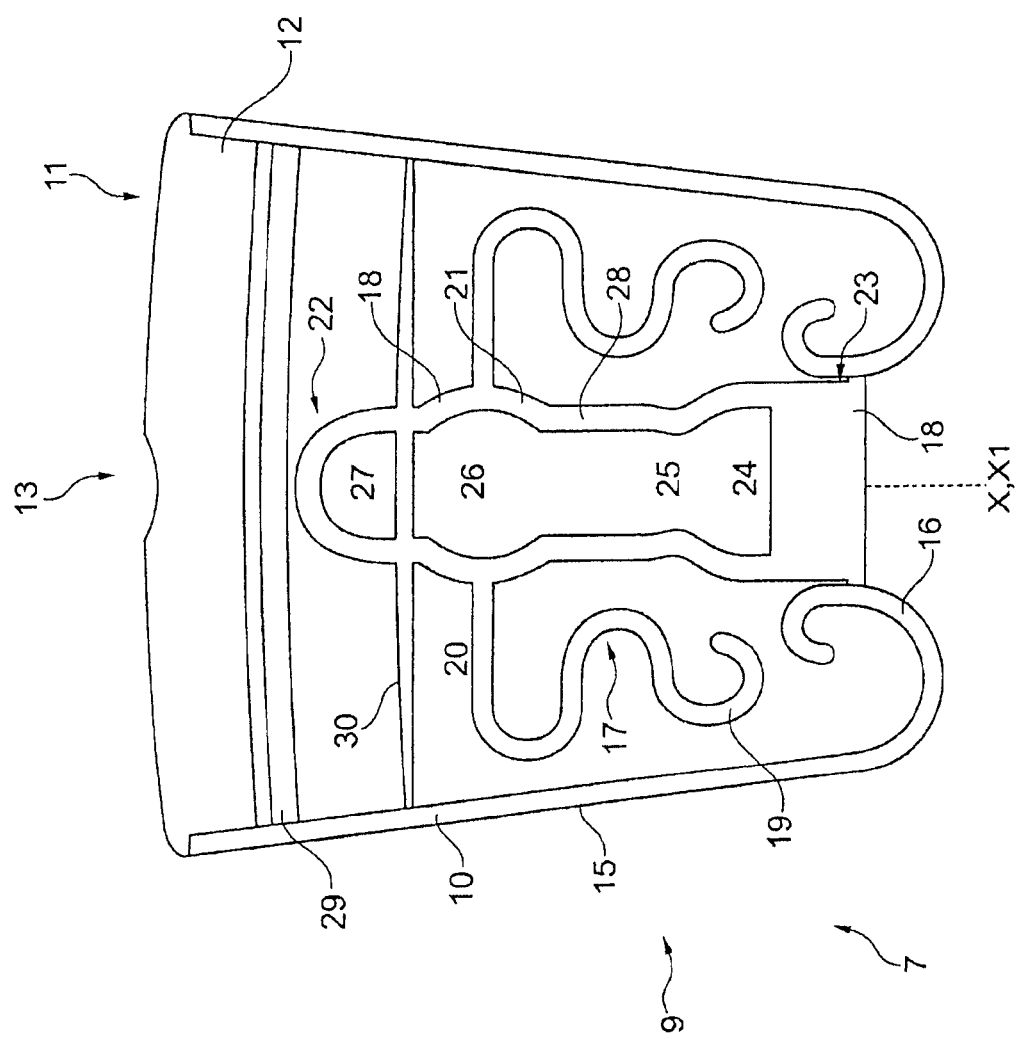

In FIG. 3, a holding device 7 according to the invention, which has a base body 9, is shown as a detail. The base body 9 is an element separate from the transport device 2, 3, 4, for example separate from the infeed star 2, said element in itself being of a pliable design at least in the direction to a centre of the transport device, hence, as an example, pliable or elastically pliable in the radial direction, wherein the holding device 7 can be detachably connected with the transport device, being preferably detachable without tools. A connection can also be achieved without tools. Pliable in itself or elastic within the meaning of the invention means that the base body 9, when force is applied, is not displaced in the radial direction, as is the case e.g. for spring-loaded pushing blades, but diverts itself, hence is effectively compressed. The radial pliability is indicated in FIG. 1 by means of the double arrows at the infeed star 2.

The base body 9 is first designed as an opened configuration, i.e. is open at its top and bottom shown in the drawing plane, and always has laterally opposing, external spring bars 10. The top and/or bottom can, of course, be closed or covered, without affecting the elastic property. On its active surface 11, the holding device 7 has a support 12. The support 12 extends transversally, in the drawing plane, between the two external spring bars 10. Approximately centrally, the support 12 has a segment-like recess 13 into which the container 5 can be inserted underneath its neck ring 14.

The external spring bars 10 each have an essentially straight spring arm 15, which always transitions to a bent first connecting area 16.

The two spring arms 15 have, for example, a path oriented towards each other, so that the base body, oriented away from its active surface 11, slightly tapers like a cone.

The holding device 7 or the base body 9 also has internal spring elements 17 connected to a fastening area 18 of the base body 9. The external spring bars 10, too, as shown, are connected with their first connecting area 16 with the fastening area 18.

The internal spring elements 17 each have a second connecting area 19 corresponding to the first connecting area 16, said second connecting area always transitioning to a bar 20 selected at the fastening area 18. The bar 20 transitions to an inverted, effectively S-shaped section which is followed by the second connecting area 19.

Figure 4:
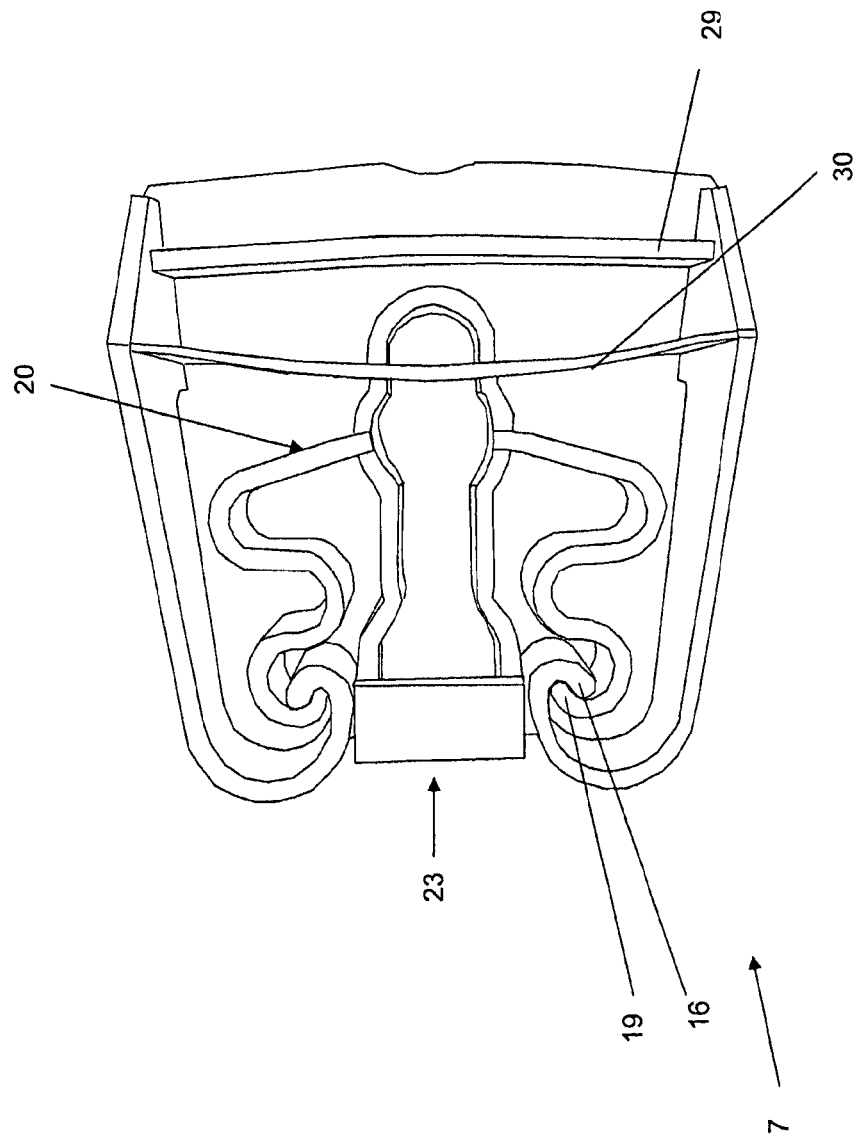

The two connecting areas 16 and 19 are effectively hooked-shaped, so that both can mesh, as shown in FIG. 4. However, it is also conceivable to hook in a separate spring between both connecting areas 16 and 19. A pretension is achieved with both configurations.

By means of the fastening area 18, the base body 9 or the holding device 7 can be fixed at the transport device, for example at the infeed star 2, in an appropriate manner and without tools.

The fastening area 18 is preferably designed as a fittable internal body 21 which, with its centre axis X1, is congruent with the centre axis of the base body X. With its head end 22, the fastening area 18 is oriented in the direction to the support 12, but distanced from it. Opposite, i.e. at the foot end (foot end 23), the fastening area 18 is closed in plate-like fashion.

The fastening area 18, at the foot end, has a first receiving area 24 which transitions to a following first engagement area 25. The first receiving area 24 is arranged at the foot end, wherein the first engagement area 25 extends in the direction to head area. The first engagement area 25 is followed, extending in the direction to the head area, by a second receiving area 26 leading into a second engagement area 27.

As can be seen, the clear openings of the two receiving areas 24 and 26 are essentially of the same design and virtually bulbous. The clear openings of the engagement areas 25 and 27, by contrast, are smaller than the clear openings of the receiving areas 24 and 26. The second engagement area 27 is fully encompassed at the head end, and only opened in the direction to the foot end 23. The first engagement area 25 is formed by two side bars 28 arranged parallel to each other.

Between the external spring bars 10, transversal spring elements 29 and 30, which are clearly recognisable in FIG. 4, extend transversally through the base body 9. A first transversal spring element 29 is arranged at the head end in the area of the support 12, wherein a second transversal spring element 30 is arranged at the second engagement area 27 of the fastening area 18. The transversal spring elements 29 and 30 can also be called leaf springs which can also take the weight force of the container 5.

The base body 9 with its respective components is preferably produced in one piece, for example moulded from a suitable plastic, wherein the pretension is retrospectively generated by connecting the connecting areas 16 and 19 (engaged or by means of a separate spring).

FIG. 3 shows a non-tensioned state of the base body 9, with FIG. 4 showing a pretensioned state of the base body 9. To this end, the two connecting areas 16 and 19 are interlinked by meshing the two hook-like connecting area ends. It can be seen that, in the pretensioned state, the bars 20 are deflected in the direction to the foot end 23.

Figure 5:
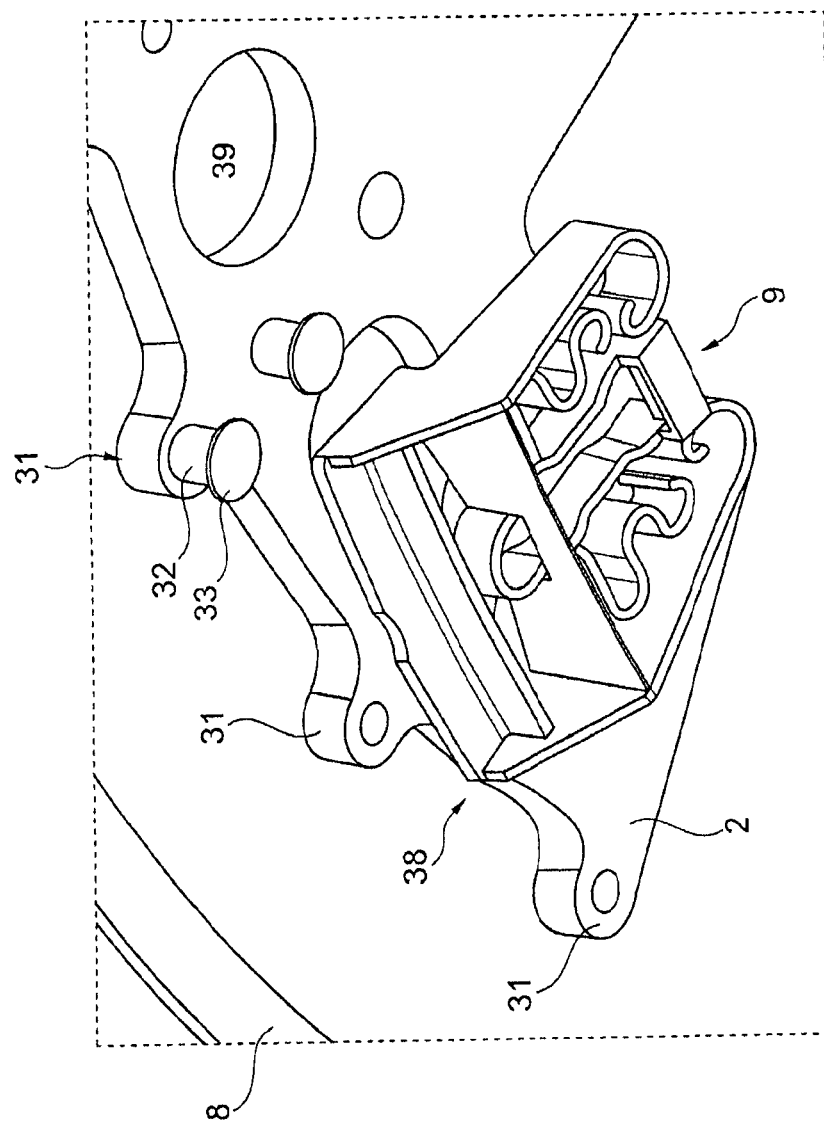
Figure 6:
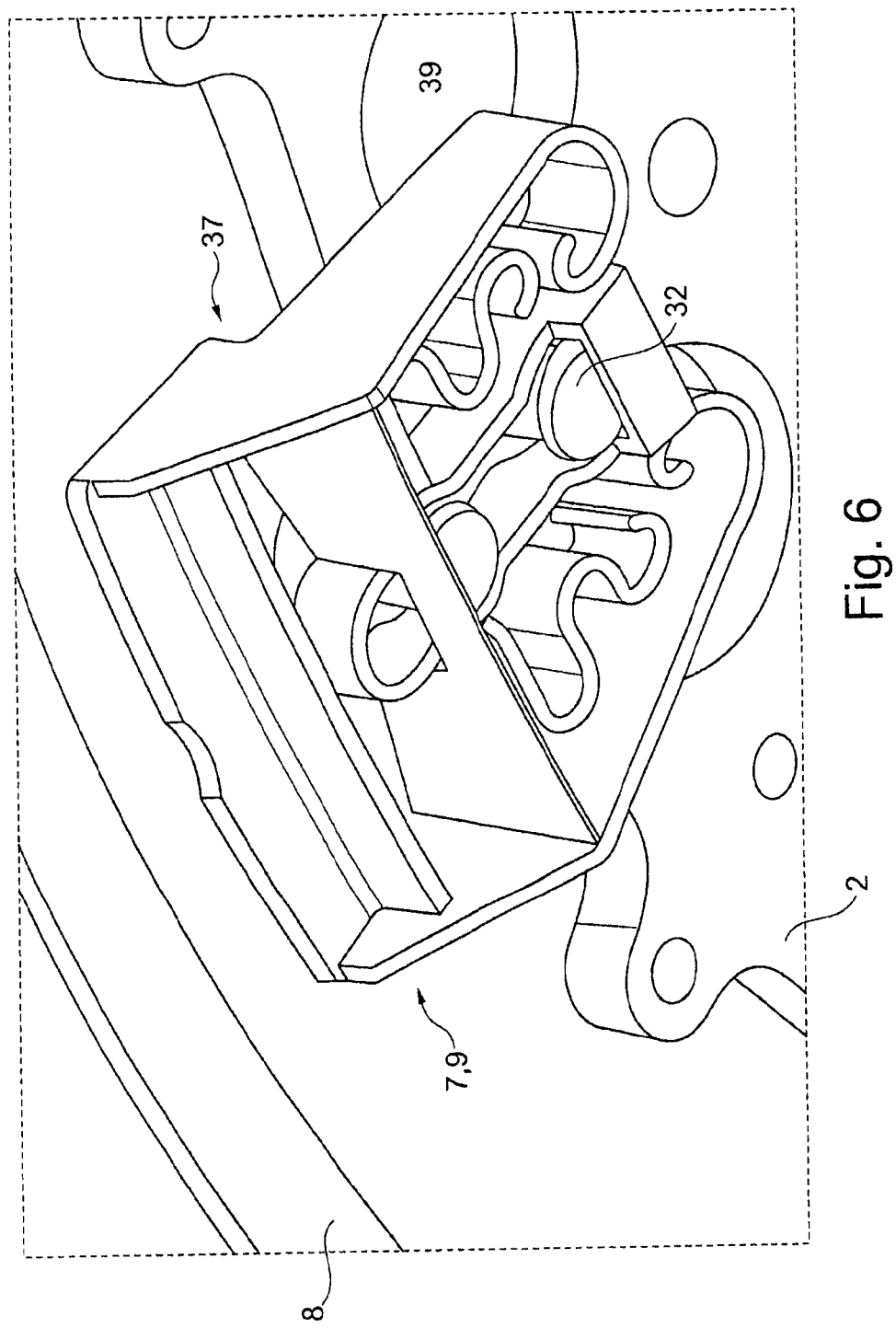
Figure 7:
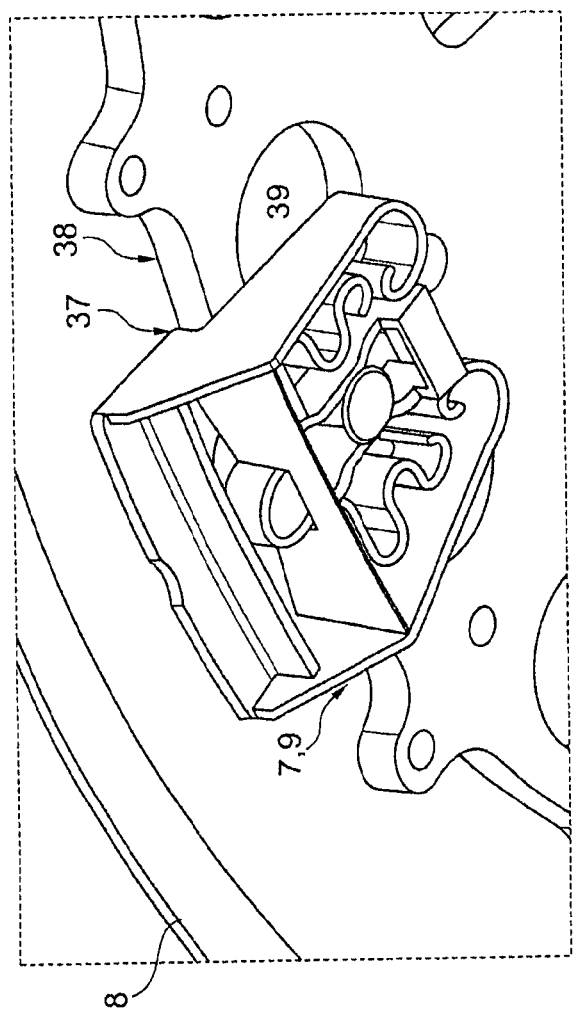

A sequence for assembling the base body 9 to the transport device or to the infeed star 2 is shown, as an example, in FIGS. 5 to 7. At the infeed star 2, as can be seen, no difficult-to-make grinding or sliding star pockets are introduced. Instead, simple bar receptacles 31 are arranged. Attachment bolts 32 are arranged at the bar receptacles 31. These can be screwed, welded or glued to the bar receptacles 31, to name but a few examples of types of connections. The attachment bolts 32 have, at the foot end, a flange ring 33, i.e. a radial extension in relation to the body of the bolt. For example two attachment bolts 32, aligned in the radial direction, are provided.

In the assembly sequence shown in FIG. 5, the base body 9 with its receiving areas 24 and 26 is arranged underneath the fixed attachment bolts 32. The base body 9 thus is guided over the attachment bolts 32 until the flange rings 33 reach behind the respective bottom edges (FIG. 6). It can also be seen that, at the foot end, the plate-like closing element 34 effectively achieves a motion limitation, wherein the free bolt end 35 contacts the plate-like closing element 34 (FIG. 6). By means of radially inward displacement of the base body 9, the attachment bolts 32 are moved to the respective engagement area 25 or 27 (FIG. 7). Advantageously, this can be achieved without tools. Disassembly would be achieved as easily without tools.

During assembly (FIGS. 5 to 7), the two connecting areas 16 and 19 are not yet interlinked. Advantageously, this only happens when the holding device 7 or the base body 9 is assembled. This simplifies the insertion of the attachment bolts 32 into the receiving areas 24 and 26, as their clear opening is thus slightly enlarged and the holding force of the engagement areas 24 and 26 also increases when the pretension is effective. In the assembled state, the base body 9 thus is held positionally stable, wherein an unwanted displacement contrary to the joining direction previously described is also automatically excluded. The two engagement areas 25 and 27 clamp the base body 9, effectively positively locked, to the transport device or to the infeed star 2. Naturally, the base body 9 can also be arranged at the outfeed star 4, with the given examples, of course, not meant to have a limiting effect.

In FIGS. 5 to 7, the special design of the individual components of the base body 9 can also be seen.

The external spring bars 10 are virtually triangular towards the active surface 11 and, with their faces, effectively form a bearing pedestal for the support 12. The first transversal spring element 29 is arranged virtually perpendicular to the support 12. The second transversal spring element 30 is virtually fly-like, that is wider on the side than in the middle.

The assembled state can be seen in FIG. 8 left in plan view, whereas, in FIG. 8 right, the view from below can be seen. It can be gleaned from FIG. 8 that the support 12 with its free edge is oriented in the direction to the supporting curve 8.

Figure 8:
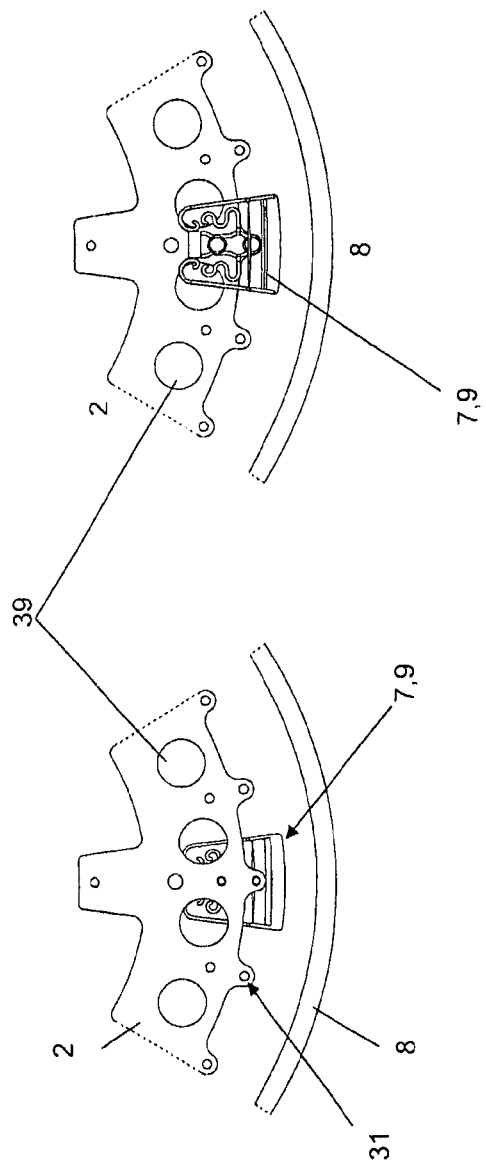

For the sake of clarity, in FIG. 8, only a single base body 9 is connected to the transport device. Of course, several holding devices 7 or base bodies 9 are intended, wherein a holding device 7 or a base body 9 can also be arranged at each bar receptacle 31.

Figure 9:
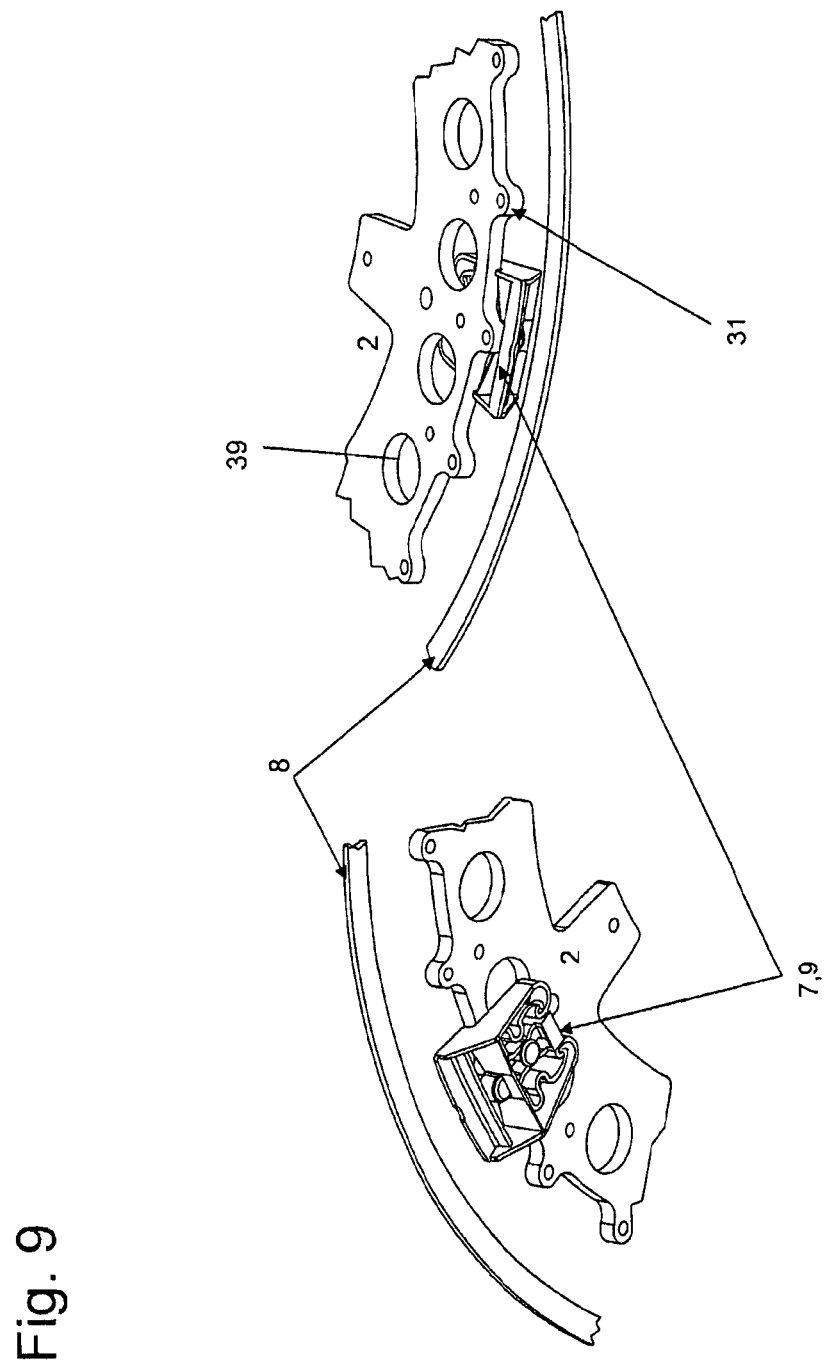

In FIG. 9, the assembly scenario from FIG. 8 is shown in perspective view.

Figure 10:
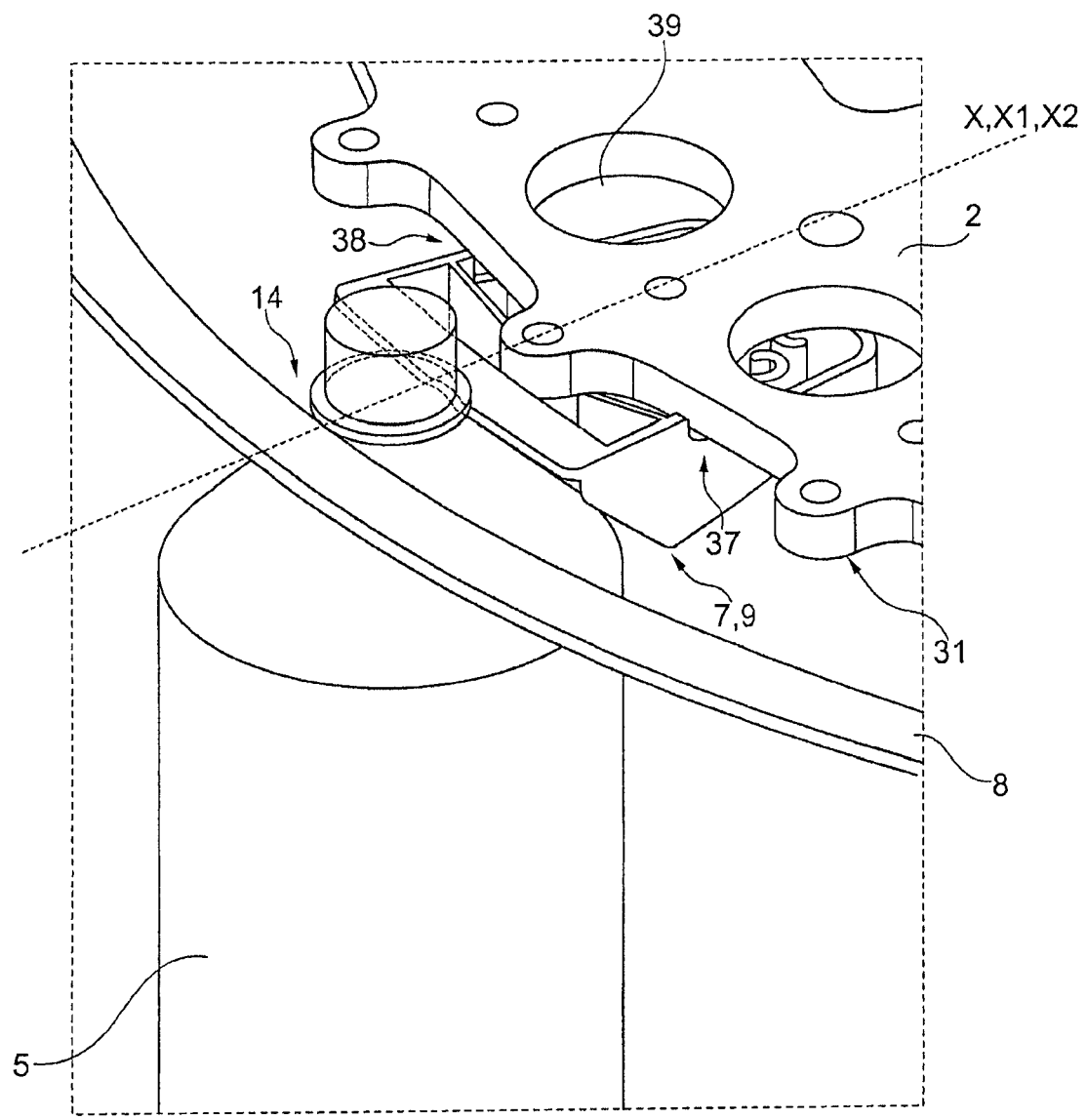

FIG. 10 shows, as an example, a transport scenario wherein the support 12 reaches under the neck ring 14 of the container 5, which slides off on the opposite side on the supporting curve 8. It can be seen in FIG. 10 that the base body 9 is step-like at its external spring bars 10, wherein the step 37 is arranged approximately in the area of the transversal spring element 30. The step 37, which is also shown in FIGS. 6 and 7, can contact the edge of the infeed star 2, as can be seen in FIG. 10. It is evident that the base body 9 with its centre axis X is congruent with the centre axis X2 of the bar receptacle 31. Between, as seen in the circumferential direction, adjacent bar receptacles 31, recesses 38 are arranged which, in the simplest geometric design, are produced instead of complicated grinding- or sliding-star-like sections. The recesses 38 are simply U-shaped with the bar receptacles 31 as U-legs. By means of the base body 9, the containers 5 are placed at the required pitch, which is why the base body 9 also takes on the function of pitching.

For example, as can be seen in FIGS. 8 to 10, openings 39 are also introduced into the infeed star 2, so that an open construction is possible, whereby cleaning work but also assembly or disassembly work is very easy to do. The recesses in the material, of course, also have a weight-reducing effect.

Figure 11:
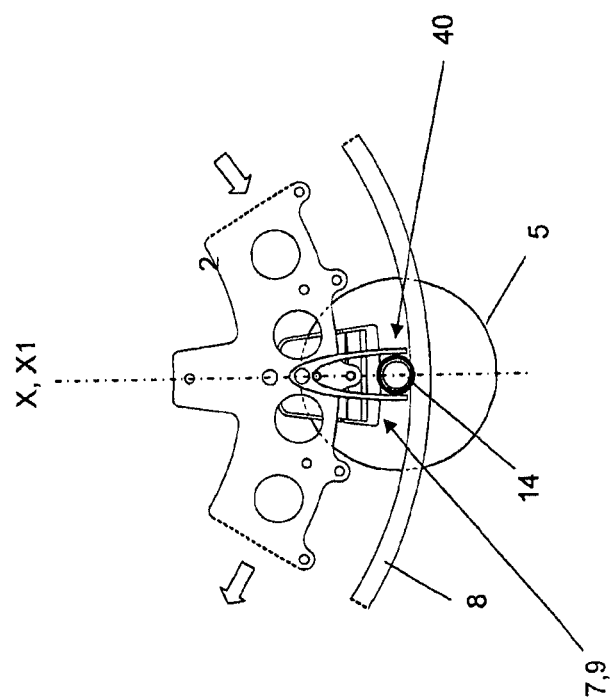

In the execution example shown in FIG. 11, a sliding and guiding element 40 is also allocated to the base body 9 or, as an example, arranged at the infeed star 2.

The sliding and guiding element 40, in plan view, is approximately parabolic in shape. On the attachment side, the sliding and guiding element 40 for example is screwed to the infeed star 2, with other suitable types of connection of course being conceivable.

It is expedient for the sliding and guiding element 40 to contact, at least with one of its legs, the mouth of the container 5 or the mouth wall above of the neck ring 14, to support the container 5 during transport in the transport direction.

Figure 12:
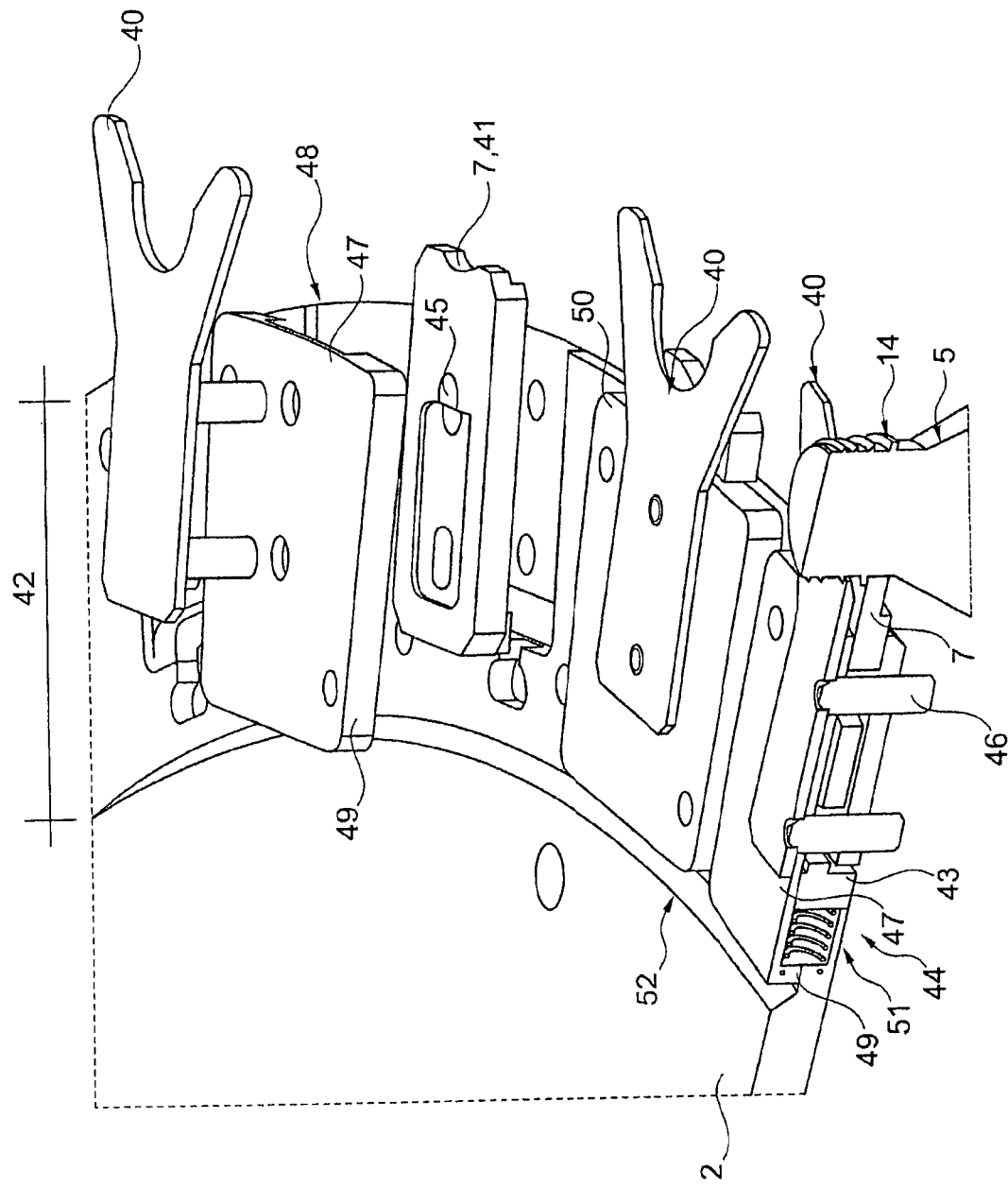

The parabolically shaped configuration of the sliding and guiding element 40 is of course only one of many possible designs. It is, however, expedient if at least two bars exist, which limit an opening, into which opening the mouth of the container can be inserted. In FIG. 12, for example, a fork-like sliding and guiding element 40 is shown.

In the execution example shown in FIG. 11, the sliding and guiding element 40 is arranged on a side of the sample infeed star 2 opposite to the base body 9. FIG. 12 shows a further advantageous configuration of the holding device 7 with a base body 41 closed at the top and/or bottom, wherein the sliding and guiding element 40 is arranged on the same side of the transport device as the base body 41. The sample infeed star 2, in terms of material, has a tapered edge area 42.

The base body 41 in the design according to FIG. 12 has a contact edge 43 which engages a recess 44 of the edge area 42. In the top and/or bottom, an elongated hole 45, which always extends in the radial direction of the infeed star 2, is introduced, serving to accommodate attachment bolts 46, wherein a rail, slot etc. can also be provided with a corresponding counterpart as guiding elements. The base body 41 is encompassed by a housing 47 which, at the face, has an opening 48 through which the active surface projects. Opposite and laterally, the housing 47 has support bars 49 which also limit the face opening 48 laterally thereto. The sliding and guiding element 40 is arranged at the housing lid 50. The attachment bolts 46 reach through the edge area 40 of the infeed star 2, the base body 41, the housing 47 and the sliding and guiding element 40. Between the rear support bar 49 of the housing 47 and the contact edge 43 of the base body 41, one or a number of spring element(s) 51 can also be arranged, as shown by way of example. By means of the spring element 51, the base body 41 can be displaced in the radial direction, additionally, if required, to an additional elastic design of the base body 41 itself.

The base body 41 reaches under the neck ring 14 of the container 5. The housing 47 acts, inter alia, as a height adjustment, so that the sliding and guiding element 40 engages above the neck ring 14. The tapering of the material in the edge area 42 is implemented by means of a transitional bevel 52.

In a further possible design, the base body 41 can also be displaced by the spring element 51 alone or adapt to the particular situations.

The invention is also suitable for making a container treatment machine operationally safer in respect of thermal changes. In FIG. 1, for example, a diameter change of the main star 3 is indicated by a dashed line 52. The diameter change can, for example, be caused by a hot filling (e.g. 90°) taking place, whereby the main star 3 enlarges for physical reasons. However, it is also possible for example during a cold filling (e.g. 6° C.), whereby the main star 3 reduces in diameter. This, however, also affects the handover from the infeed star 2 to the main star 3 and from it to the outfeed star 4. This diameter change can, however, be compensated for advantageously by the base body 9 and/or 41 or by the holding device 7.

| List of reference symbols: | |
|---|---|
| 1 | Container treatment machine |
| 2 | Transport device/infeed star |
| 3 | Transport device/main star |
| 4 | Transport device/outfeed star |
| 5 | Containers |
| 6 | Conveyor |
| 7 | Holding device |
| 8 | Supporting curve |
| 9 | Base body |
| 10 | External spring bar |
| 11 | Active surface |
| 12 | Support |
| 13 | Recess in 12 |
| 14 | Neck ring |
| 15 | Spring arm |
| 16 | First connecting area |
| 17 | Internal spring elements |
| 18 | Fastening area |
| 19 | Second connecting area |
| 20 | Bar |
| 21 | Internal body |
| 22 | Head end |
| 23 | Foot end |
| 24 | First receiving area |
| 25 | First engagement area |
| 26 | Second receiving area |
| 27 | Second engagement area |
| 28 | Side bar |
| 29 | Transversal spring element |
| 30 | Transversal spring element |
| 31 | Bar receptacle |

-continued

| List of reference symbols: | |
|---|---|
| 32 | Attachment bolt |
| 33 | Flange ring |
| 34 | Closing element |
| 35 | Free end of 32 |
| 36 | Bridging element |
| 37 | Step |
| 38 | Recess |
| 39 | Opening |
| 40 | Sliding and guiding element |
| 41 | Base body |
| 42 | Edge area |
| 43 | Contact edge |
| 44 | Recess |
| 45 | Elongated hole |
| 46 | Attachment bolt |
| 47 | Housing |
| 48 | Opening |
| 49 | Support bar |
| 50 | Housing lid |
| 51 | Spring element |
| 52 | Transitional bevel |

The invention claimed is:

1. An apparatus for transporting containers, said apparatus comprising a container transport device selected from the group consisting of a grinding star and a sliding star, said container transport device comprising a counter support along a section of said container transport device, a plurality of holding devices arranged opposite said counter support for holding and transporting containers, each holding device comprising a base body separate from said container transport device, said base body comprising spring elements, wherein said base body is configured to face said counter support at least in a direction toward a center of said container transport device, wherein said base body makes contact underneath a neck ring of a container and automatically adapts to a container diameter of said container with the support thereof, wherein said holding device is detachably connectable to said transport, wherein said base body is elastically pliable in a radial direction defined by said container transport device, and wherein said base body and components thereof are made in one piece from a plastic.

2. The apparatus of claim 1, wherein said base body is configured as a divider.

3. The apparatus of claim 1, wherein said base body comprises external spring bars that have a bent first connecting area, and internal spring elements that are connected, via a bar, with an internal body, said internal spring elements comprising a second connecting area that is configured to correspond to said first connecting area.

4. The apparatus of claim 1, wherein said base body comprises a fastening area configured as an internal body, said fastening area comprising a receiving area and an engagement area.

5. The apparatus of claim 1, wherein said base body is configured for tool-free assembly and disassembly to and from said container transport device by using attachment bolts.

6. The apparatus of claim 1, wherein said base body comprises transversal spring elements.

7. The apparatus of claim 1, wherein said base body is pre-tensioned by a connection to external spring bars comprising internal spring elements.

8. The apparatus of claim 1, further comprising a sliding and guiding element configured to engage said container above a point at which said base body engages said container.

9. The apparatus of claim 1, further comprising a sliding and guiding element configured to engage said container above said neck ring.

10. The apparatus of claim 1, further comprising a housing surrounding said base body, and a sliding and guiding element arranged at a housing lid of said housing.

11. The apparatus of claim 1, wherein said holding device comprises a gripper.

* * * * *